July 9, 1968   B. L. HAIRSTON   3,391,818

VALVED VENT MEANS

Filed Oct. 20, 1967

INVENTOR.
BOB L. HAIRSTON

BY John R. Walker, III
Attorney

United States Patent Office 3,391,818
Patented July 9, 1968

3,391,818
VALVED VENT MEANS
Bob L. Hairston, Memphis, Tenn., assignor to Forrest City Machine Works, Inc., Forrest City, Ark., a corporation of Arkansas
Filed Oct. 20, 1967, Ser. No. 676,747
5 Claims. (Cl. 220—44)

ABSTRACT OF THE DISCLOSURE

A vent device adapted to be fitted in the top of a closed tank mounted on a vehicle—the tank being adapted to contain liquid and to be transported by the vehicle. The vent device includes a floatable check member movable up and down with the rise and fall of liquid in the tank. The floatable check member, when in a down disposition, being adapted to uncover ports in the body of the device thus allowing a large flow of air into and out of the tank by the air passing through the ports and over the top of the downwardly disposed check member.

Background of the invention (1) *Field of the invention.*—The invention relates to inverted check valve type devices generally and to such devices having floatable check members which are adapted to be floatably carried upwardly by rising liquid and to seat and stop the upward flow of liquid when the check valve moves upwardly and seatingly covers the flow passageway.

(2) *Description of the prior art.*—In prior art vent devices, and such devices having floatable check members, there is not a device which permits a free passage of air when the floatable check member is in a down disposition. In the typical vent device of this type the downward flow of air and also the limited upward flow of liquid is by way of a path around the check member. Patents No. 2,393,078 and 2,627,868 illustrate vent valve means of this type. A problem with vent devices such as those above mentioned is that the valve check member prevents a free flow of air since the air must flow around the check member. In certain applications of vent valve devices, there is the necessity for passage of large quantities of air into and out of the tank and through the vent device. An example of such vent valve application wherein large quantities of air must flow through the valve is in the mobile liquid fertilizer dispensing art. Liquid fertilizer is typically dispensed on farm land by a mobile truck mounted applicator. A large tank mounted on the truck provides storage or supply means for the liquid fertilizer. Since the fertilizer liquid is dispensed at a rapid rate, the fertilizer is drained rapidly from the supply tank. Without properly venting the tank a negative pressure or partial vacuum is formed in the tank and prevents proper dispensing of the liquid.

Proper venting of large vehicle-mounted tanks is difficult to accomplish effectively for other reasons: (1) The typical vehicle-mounted tank is a closed tank having sealable closure means; (2) In most instances, it is desirable that the mobile tank be fully filled; since the typical large mobile tank is for transporting liquid, the usual practice is to fully fill the tank; (3) When the transporting vehicle moves upgrade or downgrade or is traveling over rough or slanted road surfaces, the liquid is sloshed or agitated in the tank; (4) Also, when stopping, starting or turning the vehicle, the liquid is shifted and without proper vent means spillage of the liquid occurs; (5) When a vehicle tank is full and when the vehicle is parked on a slanted surface, the liquid tends to flow through the vent in the tank; (6) Another problem is providing a valved vent device which responds quickly to the rapid rising of liquid in a tank. Valved vent devices such as shown in Patent No. 2,627,868 having small or restricted liquid passageways are slow in responding to a liquid rise in the tank. Devices of this type having restricted passageways also do not provide passageway means for sufficient flow of air into and out of the tank.

Summary of the invention

The present invention overcomes certain of the above problems by having the floatable check member arranged in the interior of the tank and floats substantially on the level of the liquid within the tank. Such an arrangement provides a floatable check member which is quickly responsive to the rising level of fluid in a tank. In the vent structure of the present invention, when the check member is in a down disposition, the check member is arranged substantially below the passage of air flowing through the vent structure and the check member does not obstruct the free passage of air into the tank. Another desirable feature of the present invention is that the vent device will properly vent a tank when it is fully filled: the uppermost ones of the air passage ports in the device are arranged above the uppermost interior surfaces of the tank upper wall and thus above the level of the liquid in a fully filled tank.

Description of the preferred embodiment

Figure 1:
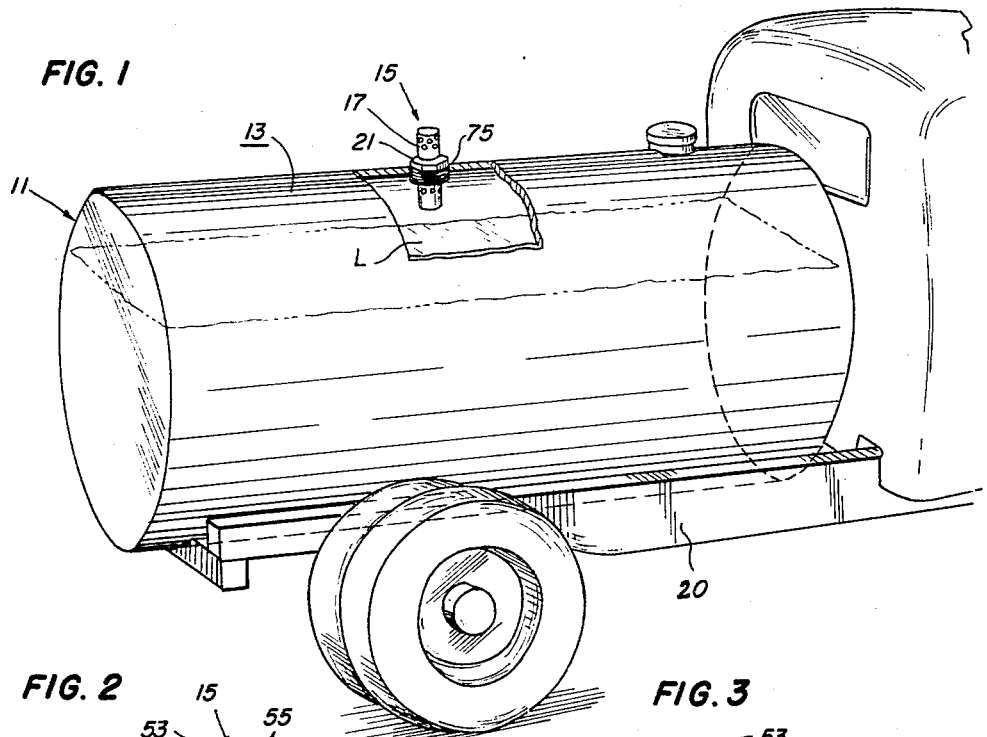
FIG. 1 is an environmental perspective view of the valved vent means of the present invention shown in conjunction with a vehicle-mounted tank and with a portion of the tank removed for purposes of disclosure.

The invention will be described in conjunction with a vehicle-mounted tank 11 having an upper semi-cylindrical wall portion 13. The valved vent device indicated 15 includes basically a body 17, a floatable check member 19 vertically displaceable in body 17; and coupling means including a coupling member 21 sealingly securing body 17 in a tank wall portion 13.

It will be understood that although the tank 11 is shown mounted on a truck 20 in the drawing, the tank may be mounted on other vehicles, such as insecticide sprayers, nurse tank sprayers, planter tank attachments or the like without departing from the spirit and scope of the present invention.

Figure 2:
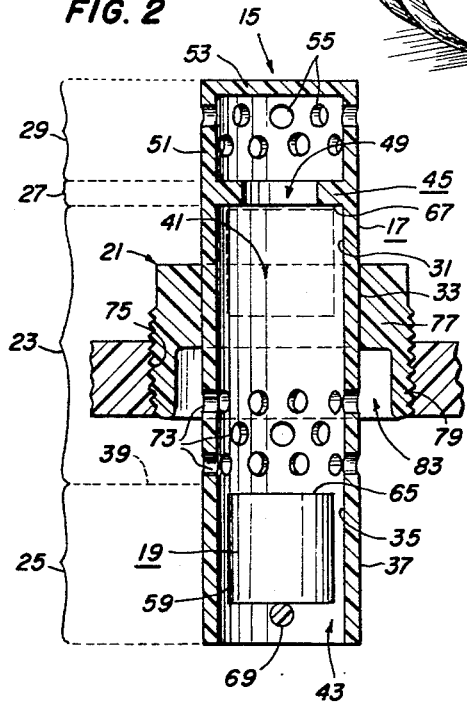
FIG. 2 is a vertical plane longitudinal center axis view of the valved vent device shown in conjunction with a fragmentary section of the upper wall portion of the liquid tank.

Body 17 is preferably formed substantially integrally and generally is of tubular configuration. Body 17 includes integrally secured coaxially aligned sections or portions including a medial portion 23, a lower portion 25, an upper portion 27 and a cover portion 29 as indicated in FIG. 2.

Medial and lower portions 23, 25 of body 17 include respectively inside and outside cylindrical surfaces 31, 33, 35, 37 respectively with the respective surfaces merging along reference line 39. Tubular medial portion 23 and lower portion 25 define respectively vertically extending main and lower passageways 41, 43. Upper portion 27 of vent body 17 includes structure defining an annular seat portion 45 adapted to coact with floatable check member 19. The inside cylindrical surface 47 of seat 45 defines an upper passageway 49.

Apertured cover portion 29 preferably is of the configuration illustrated in the drawing and is preferably integrally formed with vent body 17. As may be readily apparent, the function of cover portion 29 is to prevent dirt or foreign material from entering the vent body and yet permit free passage of air through the body. It will be understood that in certain applications of the invention the cover portion 29 of the vent device may not be necessary or other forms than that shown may be readily fabricated. Cover portion 29 includes a cylindrical wall portion 51 and a horizontal top portion 53. A plurality of radially directed circumferentially spaced apertures 55 in cover portion cylindrical wall 51 provide air passageway means into vent body 17.

Check member 19 is preferably cylindrically shaped and fabricated from rigid dense plastic material. Check member 19 in certain applications of the invention may be of solid form and constructed of cellular plastic or other floatable material. The preferred form of check member 19 is floatable by virtue of its hollow interior indicated 57. Check member 19 includes a generally cylindrical lateral wall 59 and upper and lower end walls 61, 63 sealingly secured respectively on opposite end portions of cylindrical wall 59.

Check member 19 is loosely generally coaxially fitted in body 17 and is adapted for free vertical movement upwardly and downwardly in the vent body. The upwardly facing flat surface 65 of check member 19 is adapted to sealingly abuttingly engage the downwardly facing annular flat surface 67 of seat 45; check member 19 is adapted to be raised by the liquid in the tank and upon engagement with seat 45 to stop the flow of liquid through the vent device. A stop pin 69 is diametrically fitted across lower portion 25; stop pin 69, fixedly secured in apertures 71 in portion 25, is adapted to abuttingly engage lower end wall 63 of check member 19 and to stop the downward travel of the check member.

A plurality of radially projecting vertically spaced apertures 73 are formed in the cylindrical wall of portion 23 of the vent body. Apertures 73 preferably are formed in medial portion 23 at a level above check member 19, when the check member is in a lowered position and resting on stop pin 69. The relative arrangement of the several parts, and the arrangement of apertures 73 in such that a free passage of air is permitted over the top of check member 19.

Coupling member 21 provides means adapting vent body 17 for sealed securement in an opening 75 in upper wall portion 13 of tank 11. It will be understood that various other coupling means may be desirable in certain applications of the invention and various other structures may be utilized in securing a vent body 17 in an aperture 75 of a tank wall 13.

Figure 3:
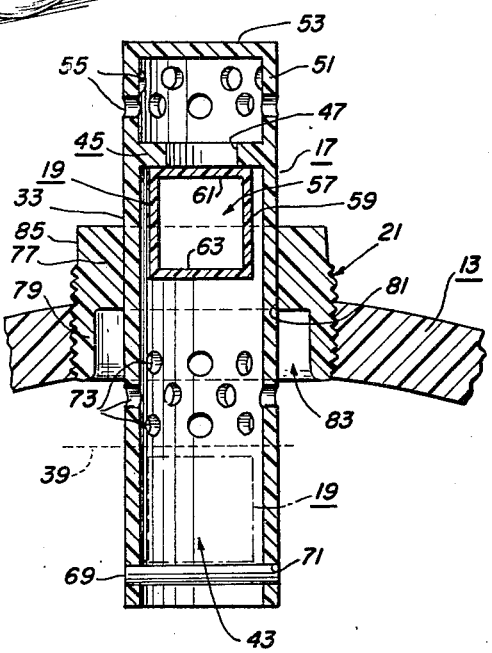
FIG. 3 is a vertical plane sectional view taken transversely of FIG. 2 and illustrating the check member in a raised disposition.

The preferred form of coupling means includes a coupling member 21 threadedly fitted in aperture 75. Coupling member 21 includes a generally annular main portion 77 and a downwardly projecting circumferential flange portion 79. Coupling member 21 is secured concentrically about body 17 with cylindrical surface 81 of main portion 77 fixedly engaging outisde cylindrical surface 33 of vent body medial portion 23. The relative axial arrangement of coupling member 21 and vent body 17 is preferably such that the uppermost ones of apertures 73 (as viewed in FIGS. 2 and 3) are arranged above the level of the lower bounding surfaces of flange portion 79 of the coupling member. The downwardly opening annular recess 83 defined by coupling flange portion 79 and body 17 provides effective means for venting tank 11 when it is fully filled with liquid L. Hexagon arranged vertical surfaces 85 on coupling member 21 provide tool engagement means for threadedly securing vent device 15 in tank 11.

Now while I have shown and described an exemplary embodiment of the present invention, it will be understood that various modifications and rearrangements of structure may be made without departing from the scope of the invention as defined in the attendant claims.

I claim:
1. The combination with a closed tank mounted on a vehicle and the like and with the tank being adapted to be filled with liquid and transported by said vehicle, valved vent means for allowing entry of air into the tank and for preventing the escape of liquid from the tank comprising an oblong body including medial structure defining generally cylindrical main passageway, coupling means extending about the lateral periphery of said medial structure adapting said body for sealed securement in an upper wall portion of said tank and with said main passageway extending vertically, said body including lower structure defining a lower passageway communicating the interior space of said tank with the main passageway of said medial structure, said body including upper structure including an annular seat defining an upper passageway communicating the main passageway of said medial structure with the space outside said tank, a check member having an upwardly facing check surface, said check member being upwardly and downwardly displaceable in said main passageway and said lower passageway, said check member being floatable in liquid and adapted to be upborne by liquid in said tank moving upwardly in said body main passageway, said check member being adapted to be raised to a stopped position with its check surface sealingly engaging said annular seat and to prevent the upward passage of liquid through said upper passageway, said check member being adapted to float downwardly with the downward flow of liquid in said main passageway, stop means for stopping the downward travel of said check member at a position whereat said check member is disposed substantially entirely within the lower passageway of said body, and means defining a plurality of laterally directed openings in the medial structure of said body for communicating the main passageway in said body with the interior of said tank and with the mean level of said openings being substantially above the level of the check surface of said check member when said check member is in a stopped lowered position.

2. The valved check means of claim 1 which additionally includes apertured cover structure secured to said body and arranged over said upper passageway of said upper wall structure for preventing dirt or foreign materials from entering said body while preventing free passage of air through said body.

3. The valved check means of claim 1 wherein said check member is formed substantially of rigid dense material and includes structure defining a sealed hollow interior.

4. The valved check means of claim 3 wherein said check member is substantially cylindrical-shaped and said upwardly facing check surface is flat and further with said annular seat including a flat downwardly facing annular surface; said check member in its stopped raised position being adapted to abuttingly engage said seat with said check member flat surface sealingly engaging the flat surface of said seat.

5. The valved check means of claim 2 wherein said coupling means includes flange structure extending axially downwardly and continuously circumferentially about the medial structure of said body and is spaced concentrically from said body, and with the level of the uppermost ones of the openings of said plurality of openings in said medial structure being substantially above the level of the lower bounding surfaces of said flange structure and also with the lower bounding surfaces of said flange structure being adapted to be arranged above the uppermost interior surface of the tank upper wall portion.

References Cited

UNITED STATES PATENTS

| | | |
|---|---|---|
| 821,624 | 5/1906 | Edison. |
| 1,721,331 | 7/1929 | Bugatti. |
| 1,851,084 | 3/1932 | Brown. |
| 1,923,384 | 8/1933 | Miller. |
| 3,199,716 | 8/1965 | Price _____ 220—44 |

THERON E. CONDON, *Primary Examiner.*

G. E. LOWRANCE, *Assistance Examiner.*